(12) United States Patent
Högasten

(10) Patent No.: US 8,515,196 B1
(45) Date of Patent: Aug. 20, 2013

(54) SYSTEMS AND METHODS FOR PROCESSING INFRARED IMAGES

(75) Inventor: Nicholas Högasten, Santa Barbara, CA (US)

(73) Assignee: Flir Systems, Inc., Wilsonville, OR (US)

( * ) Notice: Subject to any disclaimer, the term of this patent is extended or adjusted under 35 U.S.C. 154(b) by 1036 days.

(21) Appl. No.: 12/533,925

(22) Filed: Jul. 31, 2009

(51) Int. Cl.
*G06K 9/40* (2006.01)

(52) U.S. Cl.
USPC ........... 382/254; 348/164; 356/367; 358/447; 382/111; 382/115; 382/128; 382/154; 382/159; 382/261; 382/266; 382/284

(58) Field of Classification Search
None
See application file for complete search history.

(56) References Cited

U.S. PATENT DOCUMENTS

| | | | | |
|---|---|---|---|---|
| 5,602,934 | A * | 2/1997 | Li et al. | 382/128 |
| 5,739,922 | A * | 4/1998 | Matama | 358/447 |
| 6,011,626 | A * | 1/2000 | Hielscher et al. | 356/367 |
| 6,055,340 | A * | 4/2000 | Nagao | 382/261 |
| 6,373,992 | B1 * | 4/2002 | Nagao | 382/266 |
| 6,445,831 | B1 * | 9/2002 | Arai | 382/254 |
| 6,454,415 | B1 * | 9/2002 | Vlahos | 353/30 |
| 6,611,618 | B1 * | 8/2003 | Peli | 382/154 |
| 7,103,212 | B2 * | 9/2006 | Hager et al. | 382/154 |
| 8,189,050 | B1 * | 5/2012 | Hughes et al. | 348/164 |
| 2002/0015536 | A1 * | 2/2002 | Warren et al. | 382/284 |
| 2002/0054694 | A1 * | 5/2002 | Vachtsevanos et al. | 382/111 |
| 2003/0086592 | A1 * | 5/2003 | Takiguchi et al. | 382/115 |
| 2003/0088401 | A1 * | 5/2003 | Terez | 704/207 |
| 2005/0240090 | A1 * | 10/2005 | Ruchti et al. | 600/316 |
| 2008/0045847 | A1 * | 2/2008 | Farag et al. | 600/500 |
| 2008/0111894 | A1 * | 5/2008 | Tanimoto | 348/222.1 |
| 2010/0127173 | A1 * | 5/2010 | Schmidt | 250/338.5 |

* cited by examiner

*Primary Examiner* — Tsung-Yin Tsai
(74) *Attorney, Agent, or Firm* — Haynes and Boone, LLP

(57) ABSTRACT

Systems and methods disclosed herein, in accordance with one or more embodiments, provide for processing infrared images. In one embodiment, a system includes an infrared sensor adapted to capture infrared images and a processing component adapted to process the captured infrared images by extracting a high pass part from the captured infrared images, extracting a mid-spatial frequency part from the captured infrared images, extracting a low pass part from the captured infrared images, separately scaling each of the parts, and merging the scaled parts to generate enhanced output images. The system may include a display component adapted to display the enhanced output images.

20 Claims, 6 Drawing Sheets

Tile A     Tile B

Tile C     Tile D

SYSTEMS AND METHODS FOR PROCESSING INFRARED IMAGES

TECHNICAL FIELD

The present invention relates to infrared imaging systems and, in particular, to systems and methods for processing of infrared images.

BACKGROUND

Infrared cameras are utilized in a wide variety of imaging applications to capture infrared radiation from objects as infrared images. For instance, infrared cameras may be utilized for nighttime applications to enhance visibility under low light conditions.

An infrared camera, such as for example mid-wave and long-wave infrared imagers, typically produce data with a 12 to 16 bit dynamic range. Due to limitations in analog video encoders, analog video standards (such as NTSC, PAL), video monitors, digital video standards (such as MPEG4, H.264, etc.) and human perception, the effective dynamic range is usually no greater than 8 bit. Using a strict linear conversion (e.g., keeping only the 8 most significant bits of a 14-bit signal) may result in severe loss of detail information. For this reason, dynamic range compression algorithms have been developed. Some include histogram equalization (HE), contrast limited adaptive histogram equalization (CLAHE), gradient domain methods, and unsharp masking. In some cases, however, these image enhancement techniques have been developed for visible light imagers and, therefore, may not be optimal for infrared imagers.

As a result, there is a need for improved processing techniques for enhancing display of infrared images.

SUMMARY

Systems and methods disclosed herein, in accordance with one or more embodiments, relate to dynamic range compression of infrared images and real time enhancement of infrared images (e.g., infrared video images) from an infrared sensor such that radiometric information may be retained, noise may be kept low, and/or details may be enhanced. In various examples, systems and methods may be adapted to transfer an input dynamic range to an output dynamic range optimized for display to a user.

In one implementation, desired image characteristics are achieved by separating infrared images into three separate components that are scaled and combined into an output image. In one aspect, the three separate components include a detail component (D), a background component (B), and a locally enhanced component (L). The three separate components are scaled based, for example, on image statistics and/or user preferences. The scaled components of D, B, and L are merged to produce an enhanced output image that may be scaled to fit the dynamic range of a display device and/or capture device.

In accordance with an embodiment, a system includes an infrared sensor adapted to capture infrared images and a processing component adapted to process the captured infrared images by extracting a high pass part from the captured infrared images, extracting an enhanced mid-spatial frequency part from the captured infrared images, extracting a low pass part from the captured infrared images, separately scaling each of the parts, and merging the scaled parts to generate enhanced output images. The system may further include a display component adapted to display the enhanced output images.

In various implementations, the infrared sensor may be adapted to capture one or more infrared images and provide infrared sensor data related to the captured infrared images. The processing component may be adapted to receive and process the infrared sensor data to extract data for each of the high pass part, the enhanced mid-spatial frequency part, and the low pass part to thereby scale the data for each part and merge the data for each scaled part to thereby generate output image data for the enhanced output images. The display component may be adapted to display the enhanced output images based on the output image data generated by the processing component.

In various implementations, the infrared sensor may be adapted to capture infrared video images, the processing component is adapted to process the captured infrared video images to generate enhanced output video images, and the display component may be adapted to display the enhanced output video images. The system may include an image capture component having the infrared sensor adapted to capture the infrared images, and a memory component adapted to store at least one of the captured infrared images and the enhanced output images.

In various implementations, the processing component may be adapted to extract the low pass part from the captured infrared images by low pass filtering the captured infrared images to obtain the low pass part. The processing component may be adapted to extract the high pass part from the captured infrared images by subtracting the low pass part from the captured infrared images. The processing component may be adapted to extract the enhanced mid-spatial frequency part from the captured infrared images by locally histogram equalizing the low pass part to obtain the enhanced mid-spatial frequency part. The processing component may be adapted to histogram equalize the low pass part of a previous frame of the captured infrared images by utilizing a delay component. The processing component may be adapted to scale the low pass part based on a delayed histogram of the low pass part.

In various implementations, the processing component may be adapted to scale each of the parts by linearly rescaling each of the parts to a fixed dynamic range. The low pass part comprises a low spatial frequency, high signal amplitude portion of the captured infrared images that is utilized by the processing component to enhance a background component of the captured infrared images. The high pass part comprises a high spatial frequency, low signal amplitude portion of the captured infrared images that is utilized by the processing component to enhance a detail component of the captured infrared images.

In accordance with an embodiment, a method includes capturing infrared images, processing the captured infrared images to obtain a high pass portion, an enhanced mid-spatial frequency portion, and a low pass portion of the captured infrared images, separately scaling the high pass portion, the enhanced mid-spatial frequency portion, and the low pass portion of the captured infrared images, merging the scaled high pass portion, the scaled enhanced mid-spatial frequency portion, and the scaled low pass portion to provide enhanced infrared images, and displaying the enhanced infrared images.

The scope of the disclosure is defined by the claims, which are incorporated into this section by reference. A more complete understanding of embodiments of the invention may be afforded to those skilled in the art, as well as a realization of additional advantages thereof, by a consideration of the following description of one or more embodiments.

Reference may be made to the appended sheets of drawings that may first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Embodiments of the invention relate to dynamic range compression of infrared images and to real time enhancement of infrared images (e.g., infrared video images) from an infrared sensor such that radiometric information may be retained, noise may be kept low, and/or details may be enhanced. Embodiments of the invention provide a system and method for transferring an input dynamic range to an output dynamic range that may be optimized for display to a user. The desired image characteristics are achieved by separating the infrared images into three separate components that are scaled and combined into enhanced output images. In one implementation, the image enhancement system and method separates infrared images into three separate components comprising, for example, a detail component (D), a background component (B), and a locally enhanced component (L). The three separate components are separately scaled based, for example, on image statistics and/or user preferences. The scaled components of D, B, and L are merged to produce an enhanced output image that may be scaled to fit the dynamic range of a display device and/or capture device.

Figure 1A:
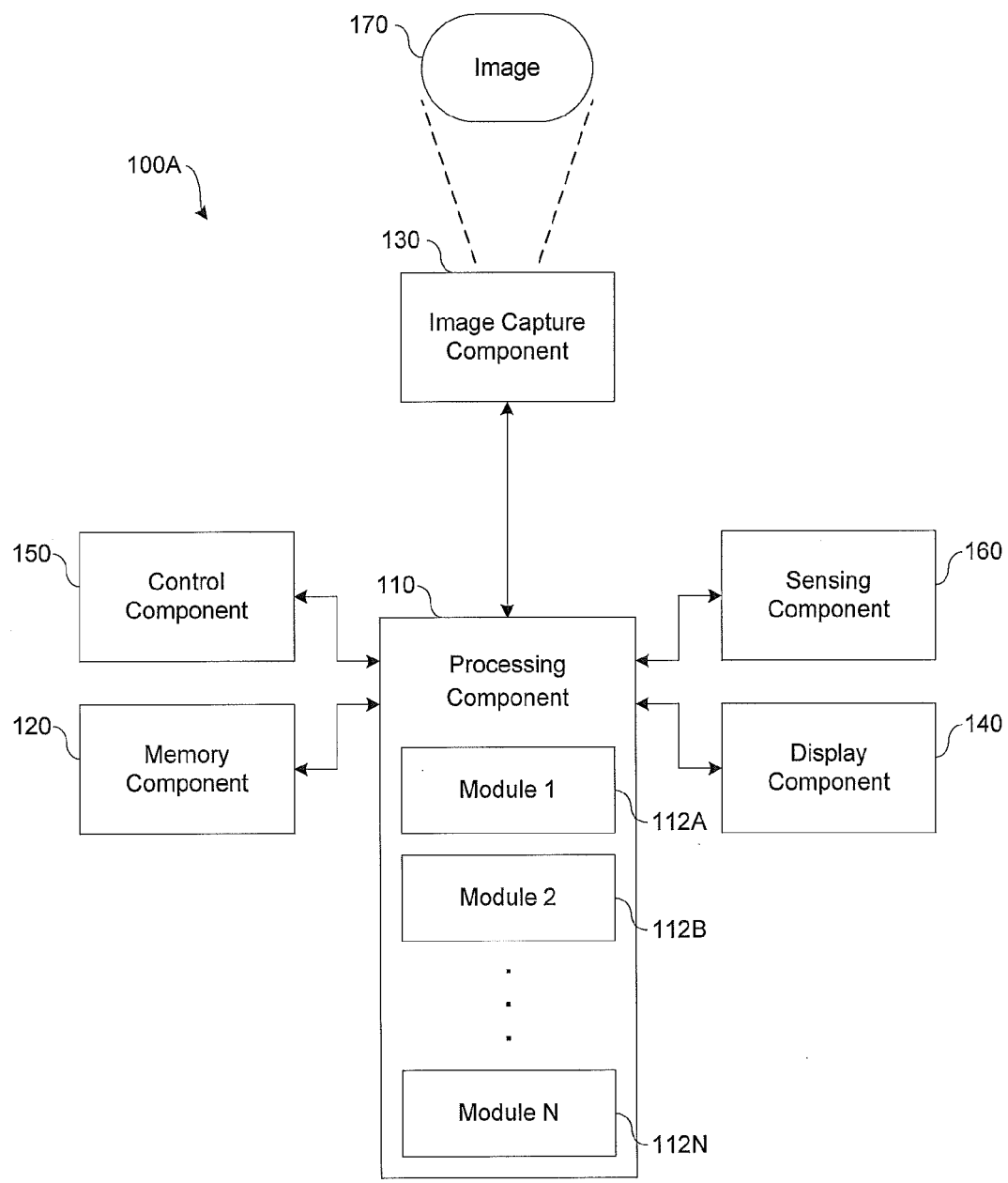
FIGS. 1A-1B show block diagrams illustrating various infrared imaging systems for capturing and processing infrared images, in accordance with various embodiments of the invention.

In accordance with an embodiment of the invention, FIG. 1A shows a block diagram illustrating an infrared imaging system 100A for capturing and processing infrared images. Infrared imaging system 100A comprises a processing component 110, a memory component 120, an image capture component 130, a display component 140, a control component 150, and optionally a sensing component 160.

In various implementations, infrared imaging system 100A may represent an infrared imaging device, such as an infrared camera, to capture one or more images, such as an image 170. Infrared imaging system 100A may represent any type of infrared camera, which for example detects infrared radiation and provides representative data (e.g., one or more snapshots or video infrared images). For example, in one implementation, infrared imaging system 100A may represent an infrared camera that is directed to the near, middle, and/or far infrared spectrums. In various other examples, infrared imaging system 100A may comprise a portable device and may be incorporated, for example, into a vehicle (e.g., a naval vehicle, a land-based vehicle, an aircraft, or a spacecraft) or a non-mobile installation requiring infrared images to be stored and/or displayed.

Processing component 110 comprises, in one embodiment, a microprocessor, a single-core processor, a multi-core processor, a microcontroller, a logic device (e.g., a programmable logic device configured to perform processing functions), a digital signal processing (DSP) device, or some other type of generally known processor. Processing component 110 is adapted to interface and communicate with components 120, 130, 140, 150 and 160 to perform image processing algorithms and/or techniques, as described herein.

In one embodiment, processing component 110 may comprise one or more modules 112A-112N (e.g., where N represents any number) for performing various image processing algorithms and/or techniques. In various implementations, the one or more modules 112A-112N may define image processing algorithms, techniques, operations and/or functions that may be embedded in processing component 110 or stored on memory component 120 for access and execution by processing component 110. For example, in one implementation, the one or more modules 112A-112N may be adapted to perform a haze processing algorithm including haze penetration filtering, as described herein.

In various embodiments, it should be appreciated that each module 112A-112N may be integrated in software and/or hardware as part of processing component 110, or code (e.g., software or configuration data) for each image processing algorithm associated with each module 112A-112N, which may be stored in memory component 120. Embodiments of each module 112A-112N may be stored by a separate computer-readable medium (e.g., various types of memory, including a hard drive, a compact disk, a digital video disk, or a flash memory) to be executed by a computer (e.g., a logic or processor-based system) to perform various image processing algorithms and/or techniques. The computer-readable medium may be portable and/or located separate from infrared imaging system 100A, with stored modules 112A-112N provided to infrared imaging system 100A by coupling the computer-readable medium to infrared imaging system 100A and/or by infrared imaging system 100A downloading (e.g., via a wired or wireless link) the modules 112A-112N from the computer-readable medium. In one aspect, modules 112A-112N provide for improved infrared camera processing techniques for real time applications, wherein a user or operator may change the image processing algorithm while viewing an image on display component 140.

Memory component 120 comprises, in one embodiment, one or more memory devices to store data and information. The one or more memory devices may comprise various types of memory including volatile and non-volatile memory devices, such as RAM (Random Access Memory), ROM (Read-Only Memory), EEPROM (Electrically-Erasable Read-Only Memory), flash memory, etc. Processing component 110 is adapted to execute software stored in memory component 120 to perform image processing.

Image capture component 130 comprises, in one embodiment, one or more infrared sensors (e.g., any type of infrared detector, such as a focal plane array) for capturing infrared image signals representative of an image, such as image 170. In one implementation, the infrared sensors of image capture component 130 provide for representing (e.g., converting) a captured image signal of image 170 as digital data (e.g., via an analog-to-digital converter included as part of the infrared sensor or separate from the infrared sensor as part of infrared imaging system 100A). Processing component 110 may be adapted to receive the infrared image signals from image capture component 130, process the infrared image signals (e.g., provide processed image data), store the infrared image signals or image data in memory component 120, and/or retrieve stored infrared image signals from memory component 120. Processing component 110 may be adapted to process infrared image signals stored in memory component 120 to provide image data (e.g., captured and/or processed infrared image data) to display component 140 for viewing by a user.

Display component 140 comprises, in one embodiment, an image display device (e.g., a liquid crystal display (LCD)) or various other types of generally known video displays or monitors. Processing component 110 may be adapted to display image data and information on display component 140. Processing component 110 may also be adapted to retrieve image data and information from memory component 120 and display any retrieved image data and information on display component 140. Display component 140 may comprise display electronics, which may be utilized by processing component 110 to display image data and information (e.g., infrared images).

Display component 140 may receive image data and information directly from image capture component 130 via processing component 110, or the image data and information may be transferred from memory component 120 via processing component 110. In one implementation, processing component 110 may initially process a captured image and present a processed image corresponding to modules 112A-112N, and then upon user input to control component 150, processing component 110 may switch the current image processing to a different image processing for viewing the processed image on display component 140. In one aspect, this switching may be referred to as applying the infrared camera processing algorithms and/or techniques of modules 112A-112N for real time applications, wherein a user or operator may change the image processing algorithm and/or technique while viewing an image on display component 140 based on user input to control component 150.

Control component 150 comprises, in one embodiment, a user input and/or interface device having one or more user actuated components, such as one or more control features, push buttons, slide bars, rotatable knobs, or a keyboard, that are adapted to generate one or more user actuated input control signals. Control component 150 may be adapted to be integrated as part of display component 140 to function as both a user input device and a display device, such as, for example, a touch screen device adapted to receive input signals from a user touching different parts of the display screen. Processing component 110 may be adapted to sense control input signals from control component 150 and respond to any sensed control input signals received therefrom. Processing component 110 may be adapted to interpret the control input signal as an input control value.

Control component 150 may comprise, in one embodiment, a control panel unit (e.g., a wired or wireless handheld control unit) having one or more user actuated control features (e.g., one or more push buttons, switches, sliders, etc.) adapted to interface with a user and receive user input control values. In various implementations, the control features of the control panel unit may be utilized to select between various image processing algorithms and/or techniques. For example, a single control feature may be implemented and used by an operator to cycle through more than one image processing algorithm and/or technique, with the selected image processing algorithm and/or technique indicated on the display component 140. In various other implementations, it should be appreciated that a control panel unit may be adapted to include one or more other user actuated control features to provide various other control functions of infrared imaging system 100A, such as auto-focus, menu enable and selection, field of view (FoV), brightness, contrast, gain, offset, spatial, temporal, and/or various other features and/or parameters. In one implementation, a variable gain value may be adjusted by a user based on a selected image processing algorithm and/or technique.

In another embodiment, control component 150 may comprise a graphical user interface (GUI), which may be integrated as part of display component 140 (e.g., a user actuated touch screen), having one or more images of, for example, user actuated control features adapted to interface with a user and receive user input control values.

Optional sensing component 160 comprises, in one embodiment, one or more various types of sensors, including environmental sensors, depending upon the desired application or implementation requirements, which provide information to processing component 110. In one aspect, processing component 110 may be adapted to communicate with sensing component 160 (e.g., by receiving sensor information from sensing component 160) and with image capture component 130 (e.g., by receiving data from image capture component 130 and providing and/or receiving command, control or other information to and/or from other components of infrared imaging system 100A).

In various implementations, optional sensing component 160 may provide data and information relating to environmental conditions, such as outside temperature, lighting conditions (e.g., day, night, dusk, and/or dawn), humidity level, specific weather conditions (e.g., sun, rain, and/or snow), distance (e.g., laser rangefinder), and/or whether a tunnel, a covered dock, or that some type of enclosure has been entered or exited. Optional sensing component 160 may represent conventional sensors as would be known by one skilled in the art for monitoring various conditions (e.g., environmental conditions) that may have an affect (e.g., on the image appearance) on the data provided by image capture component 130.

In some embodiments, optional sensing component 160 may comprise one or more devices adapted to relay information to processing component 110 via wireless communication. For example, sensing component 160 may be adapted to receive information from a satellite, through a local broadcast (e.g., radio frequency) transmission, through a mobile or cellular network and/or through information beacons in an infrastructure (e.g., a transportation or highway information beacon infrastructure) or various other wired or wireless techniques.

In various embodiments, components of image capturing system 100A may be combined and/or implemented or not, as desired or depending upon the application or requirements, with image capturing system 100A representing various functional blocks of a system. For example, in one implementation, processing component 110 may be combined with memory component 120, image capture component 130, display component 140 and/or sensing component 160. In another example, processing component 110 may be combined with image capture component 130 with only certain functions of processing component 110 performed by circuitry (e.g., a processor, a microprocessor, a microcontroller, a logic device, etc.) within image capture component 130. In still another example, control component 150 may be combined with one or more other components or be remotely connected to at least one other component, such as processing component 110, via a control wire to as to provide control signals thereto. In yet another example, components of image capturing system 100A may be part of a networked system with various portions (e.g., image capture component 130) remote from other portions (e.g., memory component 120).

Figure 1B:
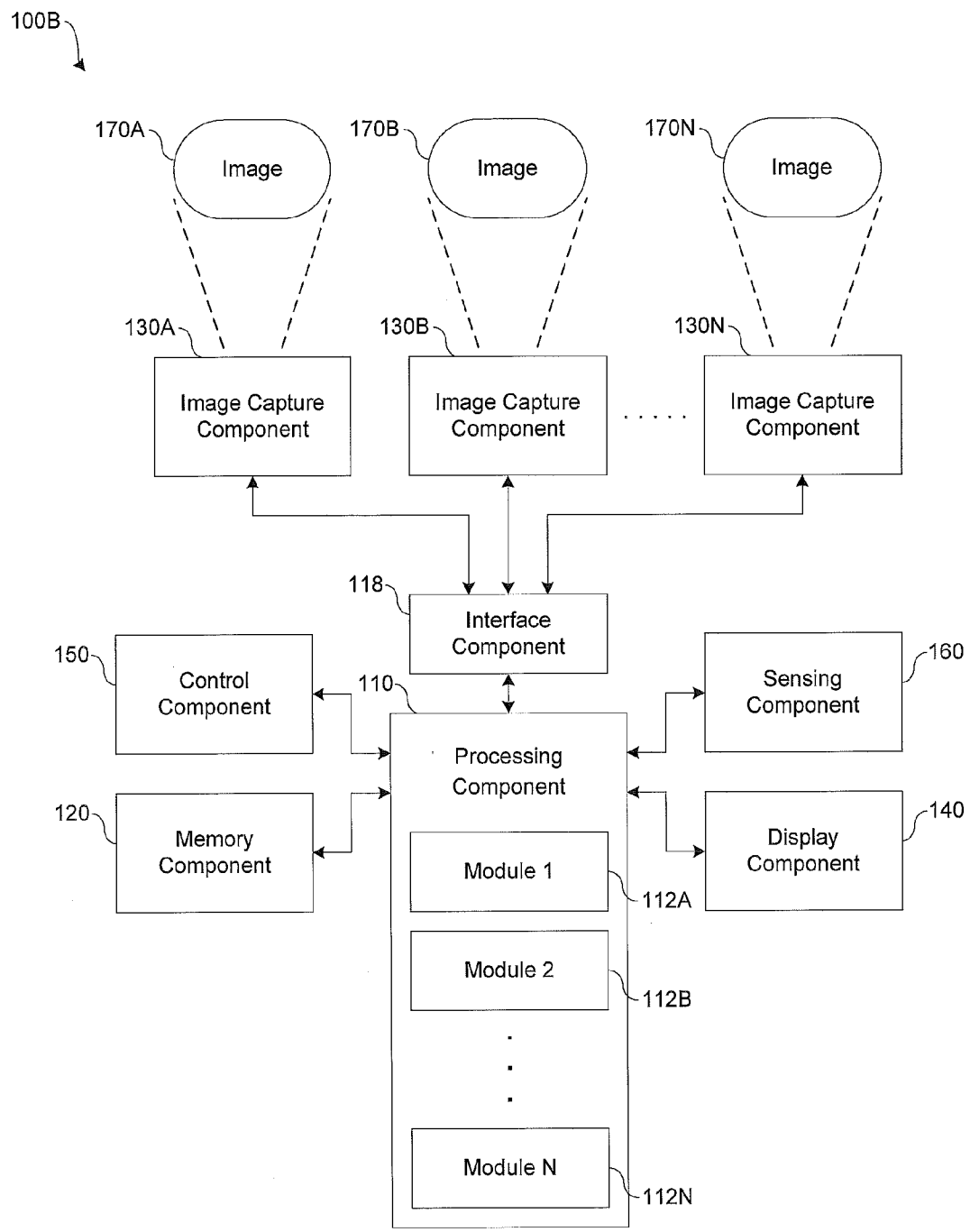

In accordance with another embodiment of the invention, FIG. 1B shows a block diagram illustrating an infrared imaging system 100B for capturing and processing infrared images. Infrared imaging system 100B comprises, in one embodiment, processing component 110, interface component 118, memory component 120, one or more image capture components 130A-130N, display component 140, control component 150, and optional sensing component 160. It should be appreciated that various components of infrared imaging system 100B of FIG. 1B may be similar in function and scope to various components of infrared imaging system 100A of FIG. 1A, and any differences between the systems 100A, 100B are described in greater detail herein.

In various implementations, infrared imaging system 100B may represent one or more infrared imaging devices, such as one or more infrared cameras, to capture images, such as images 170A-170N. In general, infrared imaging system 100B may utilize a plurality of infrared cameras, which for example detect infrared radiation and provide representative data (e.g., one or more snapshots or video infrared images). For example, infrared imaging system 100B may include one or more infrared cameras that are directed to the near, middle, and/or far infrared spectrums. In various embodiments, infrared imaging system 100B may be incorporated, for example, into a vehicle (e.g., a naval vehicle or other type of watercraft, a land-based vehicle, an aircraft, or a spacecraft) or a non-mobile installation requiring infrared images to be stored and/or displayed.

Processing component 110 is adapted to interface and communicate with a plurality of components including components 118, 120, 130A-130N, 140, 150, and/or 160 of system 100B to perform image processing algorithms and/or techniques. In various embodiments, processing component 110 may comprise one or more modules 112A-112N for performing one or more image processing algorithms and/or techniques, as described herein.

Interface component 118 comprises, in one embodiment, a communication device (e.g., modem, router, switch, hub, or Ethernet card) that allows communication between each image capture component 130A-130N and processing component 110. As such, in one aspect, processing component 110 is adapted to receive infrared image signals from each image capture component 130A-130N via interface component 118.

Each image capture component 130A-130N (where "N" represents any desired number) comprises, in various embodiments, one or more infrared sensors (e.g., any type of infrared detector, such as a focal plane array, or any type of infrared camera, such as infrared imaging system 100A) for capturing infrared image signals representative of an image, such as one or more images 170A-170N. In one implementation, the infrared sensors of image capture component 130A provide for representing (e.g., converting) a captured image signal of, for example, image 170A as digital data (e.g., via an analog-to-digital converter included as part of the infrared sensor or separate from the infrared sensor as part of infrared imaging system 100B). As such, processing component 110 may be adapted to receive the infrared image signals from each image capture component 130A-130N via interface component 118, process the infrared image signals (e.g., to provide processed image data or the processed image data may be provided by each image capture component 130A-130N), store the infrared image signals or image data in memory component 120, and/or retrieve stored infrared image signals from memory component 120. Processing component 110 may be adapted to process infrared image signals stored in memory component 120 to provide image data (e.g., captured and/or processed infrared image data) to display component 140 (e.g., one or more displays) for viewing by a user.

Figure 2:
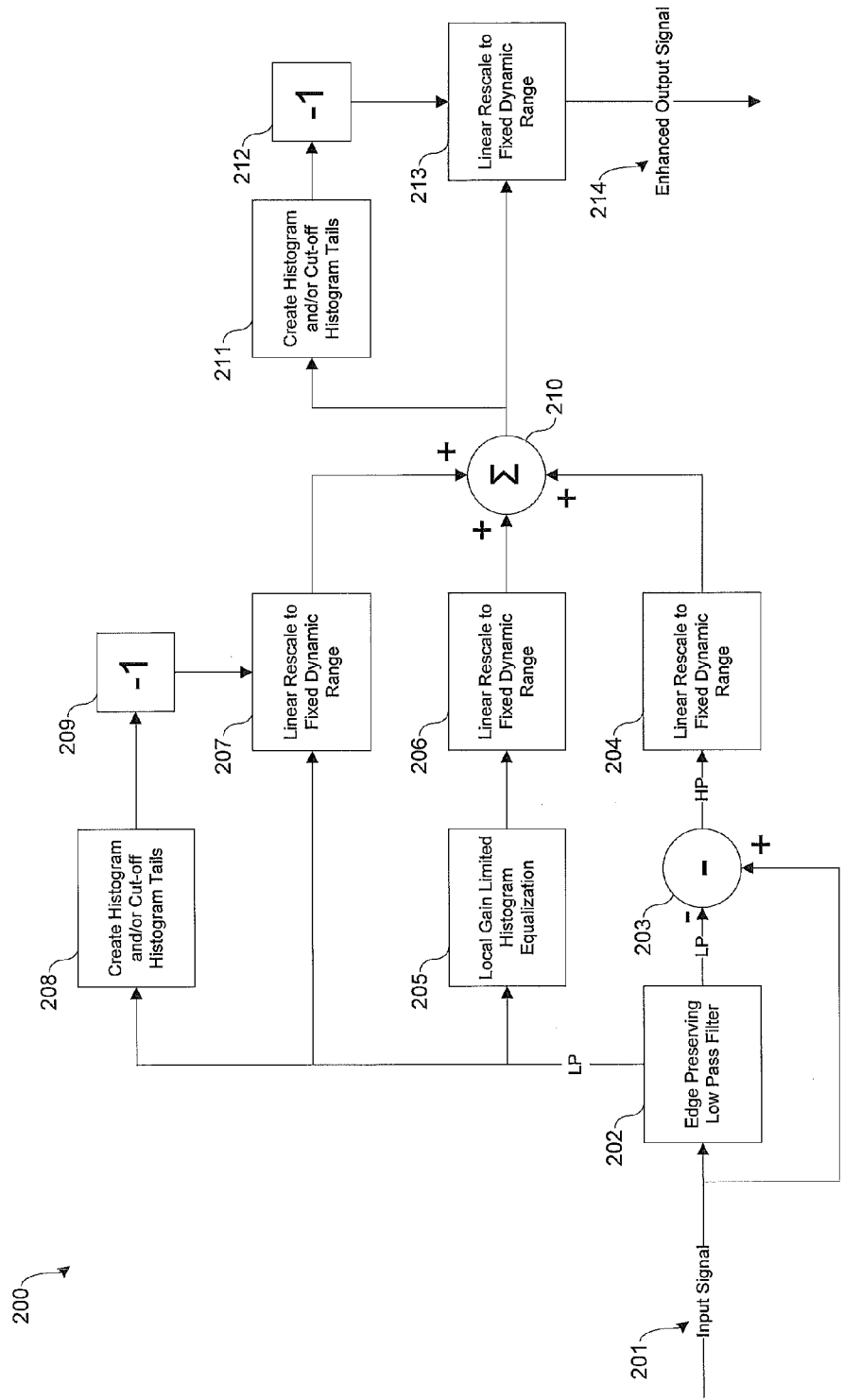
FIG. 2 shows a method of processing infrared images, in accordance with an embodiment of the invention.

FIG. 2 shows a method 200 of processing infrared images, as described in reference to an embodiment of the invention. In one aspect, the method 200 involves dynamic range compression of infrared images, including, for example, real time enhancement of video images from an infrared sensor such that radiometric information may be retained, noise may be kept low, and/or details may be enhanced. In another aspect, the method 200 involves transferring an input dynamic range to an output dynamic range optimized for display to a user. Desired image characteristics are achieved by separating the video image into, for example, three separate signals that are separately scaled and then combined into an output image. In still another aspect, the method 200 may be referred to as haze processing for infrared images that involves the use of a haze processing algorithm and/or technique, which may be performed by an infrared imaging system (e.g., systems 100A, 100B).

In one implementation, referring to the method 200 of FIG. 2, an input signal 201 (e.g., an input video signal with full dynamic range infrared sensor data) is low pass (LP) filtered 202 (with, e.g., an edge preserving low pass filter (LPF)) to provide a low pass signal. The low pass signal is subtracted 203 from the input signal 201 to produce a first component (i.e., high pass (HP) component) consisting of the low amplitude details and much of the spatial and temporal noise. In one implementation, the first component may be referred to as a detail component (D) comprising a high spatial frequency, low signal amplitude portion of the input signal 201.

The low pass signal is also processed with local histogram equalization 205 (e.g., local gain limited histogram equalized) to produce a second component. In one aspect, the second component comprises a maximum dynamic range with enhanced mid-spatial frequencies, and the second component is substantially noise free so that non-linear transfer functions do not affect local noise levels. In one implementation, the second component may be referred to as a locally enhanced component (L) of the input signal 201.

The low pass signal, in itself, comprises a third component. In one aspect, the third component (i.e., low pass component) is radiometrically accurate with, for example, high irradiance objects clearly visible due to its linear scaling. In one implementation, the third component may be referred to as a background component (B) comprising a low spatial frequency, high signal amplitude portion of the input signal 201.

After the low pass signal is subtracted 203 from the input signal 201, the first component (i.e., high pass component) is scaled in a scaling module 204 to some dynamic range (e.g., linearly rescaled to a fixed dynamic range). After being locally histogram equalized 205, the second component is scaled in a scaling module 206 to some dynamic range (e.g., linearly resealed to a fixed dynamic range). The third component (i.e., low pass component) is scaled in a scaling module 207 to some dynamic range partly based on a histogram 208 of the low pass signal from the previous frame available via a delay module 209. In one aspect, histogram processing 208 of the low pass signal may include creating a histogram (e.g., without regard to outlier values, i.e., cutting off histogram tails).

Next, a summation module 210 is adapted to sum the three components (i.e., the first, second, and third components) to provide an enhanced output signal 214 (e.g., an enhanced output video signal). In one implementation, the enhanced output signal 214 may be scaled 213 (e.g., linearly resealed to a fixed dynamic range) to fit a desired output range. In various aspects, scale factors may be determined from a histogram 211 (e.g., creating a histogram without regard to histogram tails) with a one frame delay 212.

In accordance with one or more embodiments of the present invention, the input image signal 201 provided by an infrared camera, such as 100A, 100B of FIGS. 1A, 1B, respectively, may be separated into a background component (e.g., a low spatial frequency, high signal amplitude portion of the image signal) and a detail component (e.g., a high spatial frequency, low signal amplitude portion of the image signal). The image enhancement method 200 separates the input image signal (e.g., an infrared video signal) into three components, including a detail component (D), a background component (B), and a locally enhanced component (L). The three components (D, B, L) may be scaled individually based on image statistics and/or user preferences. The scaled version of the three components (D, B, L) may be merged or fused to provide an enhanced output image signal that may be scaled to fit a dynamic range of the display device and/or capture device.

In one implementation, the input signal 201 comprises a video signal that may be from a mid-wave or long-wave infrared imager and have a maximum dynamic range of 14 bits (i.e., $2^{14}$). In other implementations, the method 200 may be applied to a monochrome video signal or to color or luminance components, individually, of a multispectral video signal. It should be appreciated that the input signal may comprise noise characteristics typical of an infrared imaging system.

In one embodiment, a non-linear edge preserving filter may be used to separate high spatial frequency, low signal amplitude texture, and details from the low spatial frequency, high signal amplitude background image. For example, a median filter may be used to provide a low pass signal, and subtracting the low pass signal from the original signal provides a high pass signal. In various examples, other low pass filters (LPF) or high pass filters (HPF), that may be adapted to operate in the frequency or wavelet domain, may be used, as understood by those skilled in the art.

In one aspect, the high pass part (HPP) of the signal may be multiplied by some gain value to provide a desired dynamic range of this part of the signal. The gain value may be determined based on properties of the high pass signal. These properties may include, but are not limited to, histogram distribution, dynamic range, and/or mean intensity. The high pass signal gain value may be determined based on know properties of the sensor/camera configuration, such as, for example, temporal and spatial noise levels or responsivity. The gain value may be based on properties of the filter used to separate high pass and low pass parts. Such properties may comprise, but are not limited to, maximum signal amplitude expected in the high pass part, which in turn may be based on some threshold or other control parameter used in the filter (LPF and/or HPF). The gain value for the high pass part may be set by the user based on preferences with a high gain value producing more detail and fine structure but also more noise in the final video signal. It should be appreciated that any or all of these methods for determining the gain value may be combined to determine the optimum value including the instance where the user setting only partially controls the gain value.

In another aspect, local histogram equalization (LHE) may be performed on the low pass part (LPP) of the signal. The image may be divided into tiles. For example, 48 tiles in 6 rows and 8 columns may be used. For a sensor with 640 columns and 480 rows of pixels (VGA), this provides tiles 80×80 pixels large. For each tile, a histogram may be calculated, wherein the cumulative sum of the histogram may be used to provide a non-linear, monotonically increasing transfer function. The low pass signal that the local histogram equalization operation is being performed on may be considered noise free. Therefore, the non-linear gain effect of histogram equalization may not affect the local noise characteristics. In some cases, it may be beneficial to limit the maximum slope of the transfer function as a substantially weak input signal; otherwise, the input signal may be stretched over a wide dynamic range in the output signal. Since the input signal is digital, a quantum step of a single digital count in the low pass signal 14-bit domain may become, for example, a step of 20 counts in the output 8-bit domain. In general, this may not produce visually appealing images.

In one aspect, histogram equalization (HE) is a very low complexity algorithm to preserve or increase contrast in an image undergoing dynamic range compression. Though there are many variants of this algorithm, it basically operates on the principle that areas of a scene that constitute the dominating intensity span (i.e., many pixels lie within this span) receive more of the available output dynamic range. This may, in some cases, produce visually pleasing images. By using HE, the image is free from artifacts, such as halos or blurring, which other methods for detail enhancement may suffer from. However, HE by itself is often not an ideal method for enhancing infrared images. Firstly, the details that are of interest to the user may not be part of the dominating intensity range, in which case, the contrast in this part of the image may be decreased or lost. Secondly, the non-linear intensity mapping that is the result of HE may result in different noise levels for different parts of the image. This may not be a problem when the signal to noise ratio (SNR) is very, good, but in infrared (IR) imaging, SNR may sometimes be poor. Specifically, IR imagers may have significant spatial noise. Lastly, HE may provide zero dynamic range to intensity spans in the input image, if there are no pixels belonging to this span. In an infrared image, there may be one or two objects that have an order of magnitude higher irradiation than anything else in the image. In a linear mapping, from input to output dynamic range, these objects may be clearly visible. When HE is applied, these objects may be given an output intensity that is merely a fraction brighter than the background, thus making them hard to detect.

In another aspect, local histogram equalization (LHE) is similar to HE except it is performed independently or somewhat independently on multiple tiles (i.e., sub images). One particular variant is referred to as contrast limited adaptive histogram equalization (CLAHE). This may be used successfully in medical image processing. CLAHE may sometimes overcome a problem of giving to little or no contrast to small areas with intensities outside the main intensity span. For very small areas, the problem persists, since CLAHE is effectively doing HE on a smaller image. An additional problem with LHE methods is that, in general, they do not preserve radiometric ordering. When using global HE, the intensity mapping may be monotonically increasing; i.e., if a pixel A is at a higher intensity level than pixel B in the original image, pixel A may be at a higher or equal intensity in the HE image. With LHE, pixel B may be "brighter" than pixel A after the transform even though that is not the case in the input image. This makes the method less practical for applications where situational awareness requires at least some preservation of absolute irradiation/brightness.

In another aspect, another family of detail enhancing filters manipulates the image gradient field to attenuate strong gradients on the behalf of weaker gradients. This method has shown very good results but is of high computational complexity, and it uses a decomposition of the image through blurring and sub-sampling to create a Gaussian pyramid representing gradients at different scales. This may require the entire frame to be available in memory and, therefore, may introduce at least one frame of latency. So, for reasons of high computational burden, large memory requirements, latency, and the fact that the method is not free from artifacts (e.g., halos) make it unpractical for real time infrared imaging.

In another aspect, a common way to enhance details in images is to use a linear or non-linear low pass filter (LPF) and subtract some portion of the LPF output from the original image. This attenuates low frequencies and gives more of the available output dynamic range to the higher spatial frequencies. One such member of the family of linear filters is referred to as an unsharp mask. This filter is used in image processing software packages. For moderate detail enhancement, the LPF may produce good results, but it inevitably distorts edges in the image and is, therefore, undesirable. Using non-linear filters, such as a bilateral filter, strong edges may be preserved. If the same filter settings are used globally over the frame, this method may have one distinct advantage over HE and LHE in that the noise level may be the same in all parts of the image preserving local SNR equality. Non-linear LPFs have fewer artifacts but may still produce halos around some object in the scene. In low SNR conditions, LPFs may not provide the desired result, since there are few details to enhance. This is not untypical in IR imaging situations, such as fog, haze, etc.

For the reasons above, embodiments of the invention may overcome the deficiencies of conventional techniques by preserving radiometric information, keeping the noise level constant over the entire image, and/or preserving detail information, while keeping the image visually appealing, being computationally effective, and not introducing latency.

Figure 3:
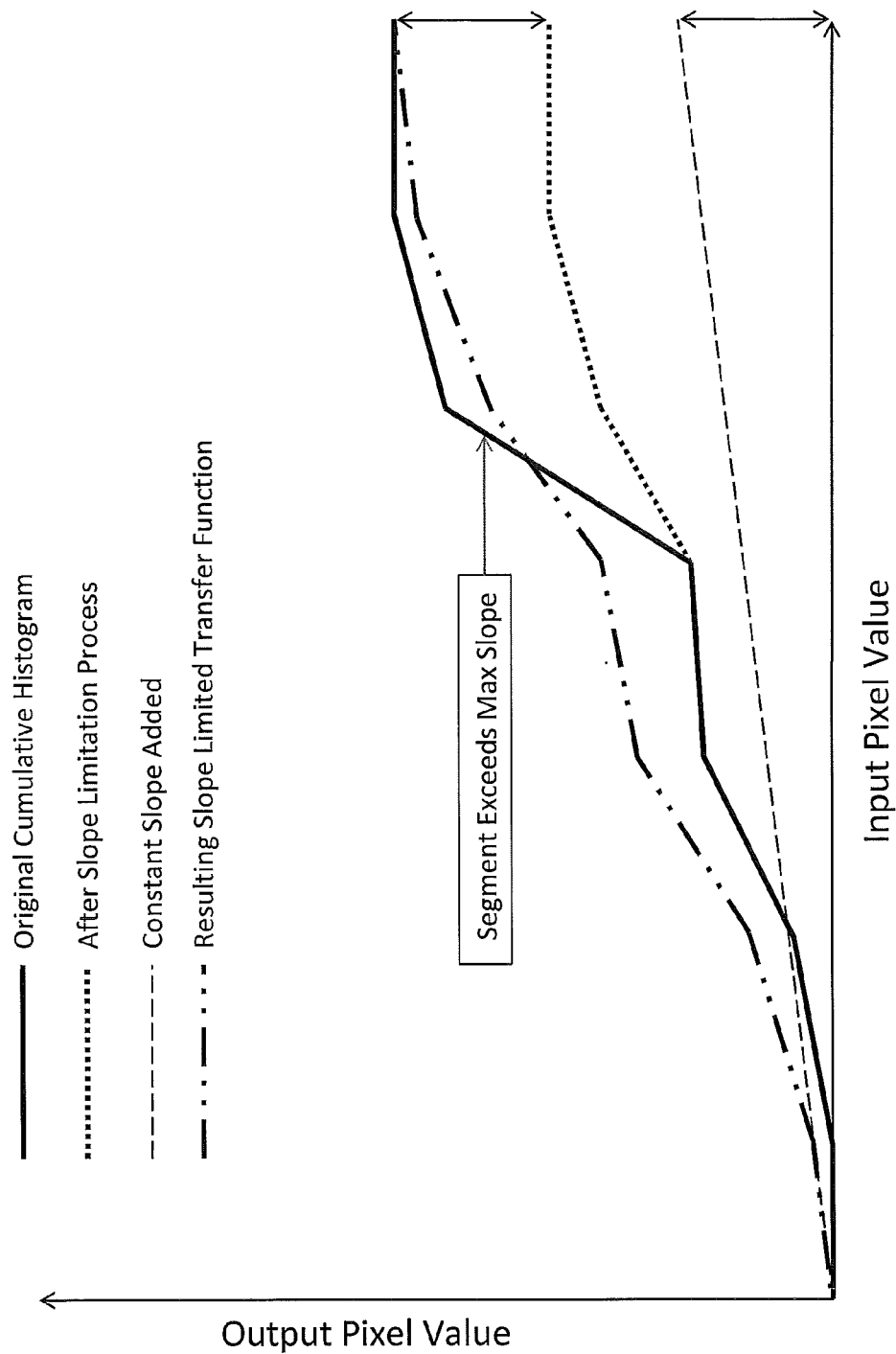
FIG. 3 shows a graphic diagram of a slope limitation process, in accordance with an embodiment of the invention.

In one embodiment, FIG. 3 illustrates the effect of limiting the maximum slope of the cumulative histogram with a slope limitation process. In one aspect, areas where the slope of the cumulative sum of the histogram is large are modified so that the slope does not exceed some predefined value. This causes a downward shift of the transfer function to the right of the modification. The final transfer function is shifted back by adding a constant slope term to all elements of the cumulative histogram. Note that, in one aspect, the slope (or gradient) is always greater than or equal to zero.

For example, if the slope for some position in the transfer function is limited in magnitude, the slope limited value(s) and all values to the right of that value, in one aspect, must be shifted down to preserve continuity of the transfer function. After the last element in the cumulative histogram is shifted down, a difference between the slope limited cumulative histogram and the original cumulative histogram may be calculated. This difference is added back to the slope limited cumulative histogram as a linear component spread out over the entire input dynamic range.

Figure 4:
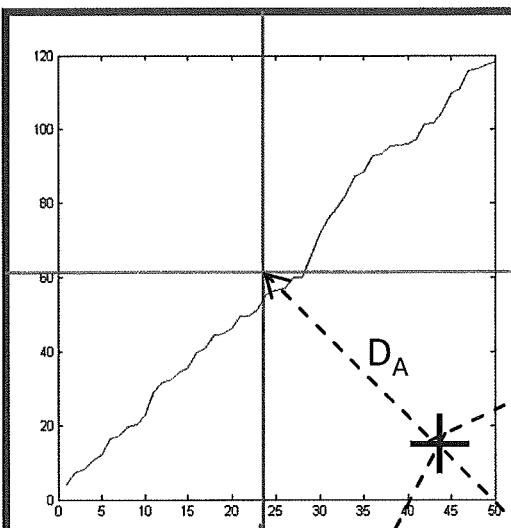
FIG. 4 shows a graphic diagram of a transfer function output blending, in accordance with an embodiment of the invention.
Figure 4:
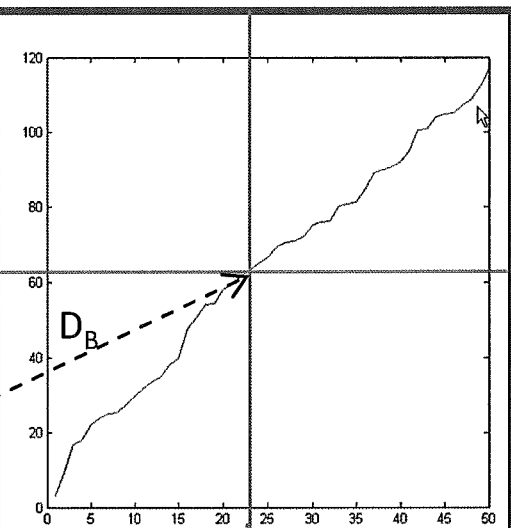
Figure 4:
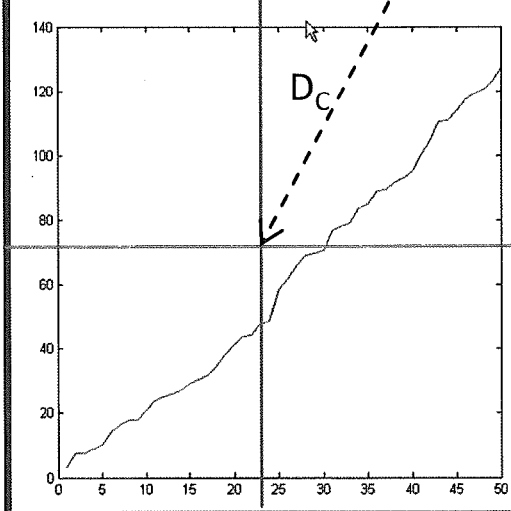
Figure 4:
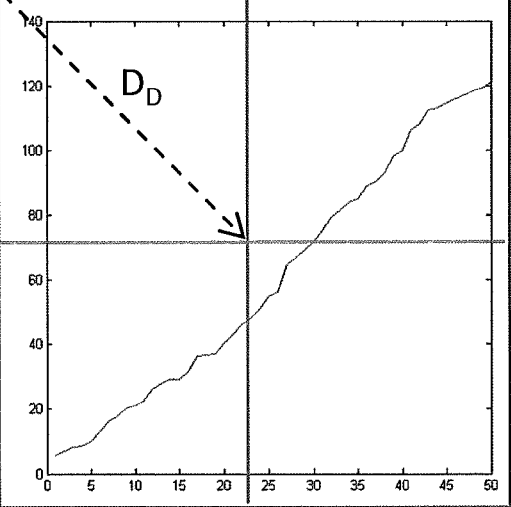
Figure 5:
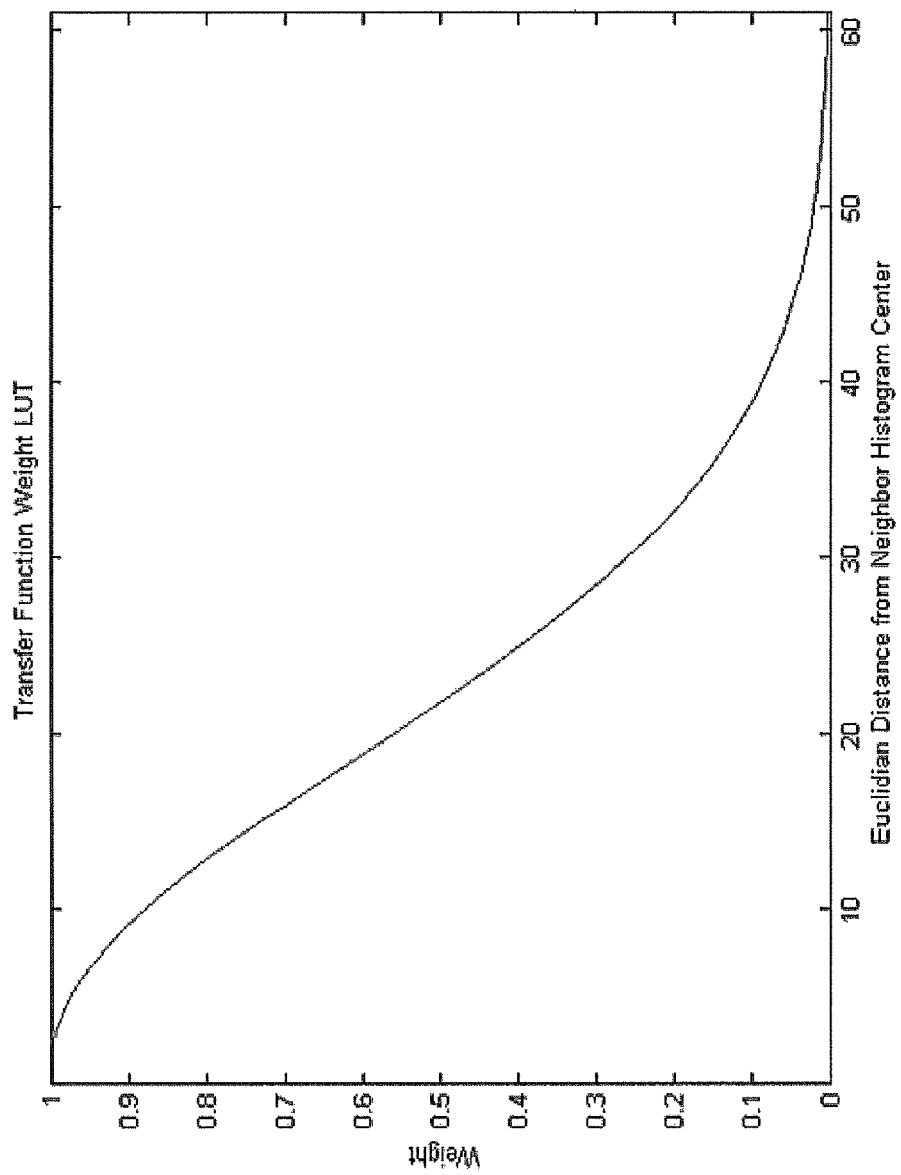
FIG. 5 shows a graphic diagram of a transfer function output weighting, in accordance with an embodiment of the invention.

FIG. 4 shows one embodiment of a transfer function output blending. For the input pixel marked (i.e., with a crosshair mark) four distances DA, DB, DC, DD are calculated. In this case, the output value for the marked pixel may depend on the transfer function of tile A and less on the output of the transfer functions for tiles B, C, and D. FIG. 5 shows one embodiment of a lookup table for transfer function output weighting. In this example, the further a pixel is from a neighbor tile center, the lower the weight.

In one embodiment, for each tile, the process of creating a slope limited cumulative histogram (SLCH) is repeated. The SLCH is used as the transfer function to map input signal to output signals. For this reason, the SLCH is normalized such that it fits the desired output dynamic range (e.g., 0-255). To reduce blocking artifacts, any given pixel value belonging to a specific tile may use multiple transfer functions to produce a weighted average transfer function output. A weighting process is illustrated in FIG. 4. The further away from the center of the tile a pixel is located, the less weight the associated SLCH will have for that pixel. The four nearest tile centers and their respective SLCH's are identified for the input pixel. Four output values are computed using each of the four SLCH transfer functions. A weighted mean is calculated where the weights are inversely proportional to the distance from the tile centers. The distance measure may be Euclidian or for better computational efficiency a Manhattan distance measure may be used. Weight(s) may, for example, be inversely linearly proportional to said distance, but any monotonically decreasing function, linear or non linear, may be used. In a preferred embodiment of this weighting function, a Gaussian function is implemented as a lookup table, as shown in FIG. 5. To further reduce the risk of blocking artifacts, the tiles may overlap, e.g., by using the same number of tiles as mentioned above, but making every tile 100×100 pixels allows for a 20-pixel overlap in each direction.

In a real time application with video, signal content in a particular tile may change dramatically from frame to frame, e.g., if there is camera motion or a rapidly moving object in the scene. The changes in signal may result in changing histograms, which may change the transfer function. In one aspect, to inhibit tile flickering effects (e.g., as a high irradiance object moves from tile to tile), embodiments of the present invention may use a damping coefficient to limit the temporal (i.e., frame to frame) rate of change of the transfer function for each tile, respectively. In one embodiment, two histograms are used: a new histogram calculated using the current pixel values in the tile and a filtered histogram representing the temporal damped histogram from the previous frame. The histogram used to generate the SLCH may be a weighted sum of the damped histogram and the new histogram. For a histogram H of length N, a damped histogram D for frame t is calculated according to a first equation (i.e., Equation 1).

$$\forall \eta \in \{1,2,3 \ldots N\} D_n^t = \alpha D_n^{t-1} + (1-\alpha) H_n^t, 0 < \alpha < 1 \quad \text{Equation 1:}$$

In various aspects, referring to Equation 1, greater values of α slows down the temporal rate of change, and inversely, lower values for α allows for faster adaptation to scene changes but also a higher risk of tile flickering. The new damped histograms may only be calculated once all pixel values in the tile have been collected. It is possible to buffer all the data needed for the first row of tiles (e.g., assuming pixel values are read out line by line) and to apply the transfer functions, but for reduced memory requirements, the preferred solution is to apply the transfer function (given by the damped histogram) calculated in frame t to the pixel values of frame t+1 thereby minimizing latency in the overall system. In one aspect, a constant gain may be applied to all pixels to scale the dynamic range of the local histogram equalized component of the image to some desired value.

In one embodiment, the low pass part (LPP) of the signal may pass through a linear scaling process. This linearly scaled low pass part may be close to radiometrical accuracy. The linear scaling may be performed by simply multiplying every input pixel with a constant to meet a desired output dynamic range for this component. The value of the constant may be derived by measuring the input dynamic range of the low pass part. One way to measure this is to collect a histogram of the LPP pixel values. In a preferred embodiment, the lowest and highest pixel values may be discarded when determining the input dynamic range. This prevents small, very high or very low irradiance objects from affecting scaling. For example, 0.3 percent of the pixels in the high and low irradiance ends, respectively, are discarded and clamped. A scaling factor S may be calculated from a second equation (i.e., Equation 2), where $IDR_C$ is the clamped Input Dynamic Range and (ODR) is the desired Output Dynamic Range for the linearly scaled LPP. Analogous to the local histogram equalization, the IDR may not be known until all the pixels have been processed, and to minimize the latency, the IDR from frame t−1 is used to calculate S at frame t. A similar damping function as in the first equation (i.e., Equation 1) may be used to update the clamped histogram. This may inhibit fast oscillations of S and may make the video appearance more stable over time.

$$S^t = \frac{ODR}{IDR_C^{t-1}} \qquad \text{Equation 2}$$

In one aspect, direct damping of S may be possible and may be less computationally intensive than damping all the values of the histogram bins, and as should be apparent to one skilled in the art, damping S may directly have a similar effect. ODR may be derived indirectly from some user preference, or ODR may be automatically calculated based in the statistical properties of the LPP signal. In a preferred embodiment, the scale factor S may be limited to some maximum value to inhibit a substantially low IDR to be stretched over a large ODR, which may cause undesired esthetical effects in the final output image, such as smooth gradients having large quantization effects (e.g., large steps in luminance due to limitations of fixed point signal representation and digital sampling).

In one embodiment, as described in reference to FIG. 2, the method 200 merges the three components to provide an enhanced output signal. This may be achieved by addition of the HPP, local histogram equalized LPP, and the linearly scaled LPP. The final output dynamic may not exactly match that of the desired output dynamic range, and a process identical to that described for linearly scaling the LPP may be used to scale the merged output signal to, as an example, the 16-235 or 0-255 range, which may be typical for some monochrome video formats.

Where applicable, various embodiments of the invention may be implemented using hardware, software, or various combinations of hardware and software. Where applicable, various hardware components and/or software components set forth herein may be combined into composite components comprising software, hardware, and/or both without departing from the scope and functionality of the invention. Where applicable, various hardware components and/or software components set forth herein may be separated into subcomponents having software, hardware, and/or both without departing from the scope and functionality of the invention. Where applicable, it is contemplated that software components may be implemented as hardware components and vice-versa.

Software, in accordance with the invention, such as program code and/or data, may be stored on one or more computer readable mediums. It is also contemplated that software identified herein may be implemented using one or more general purpose or specific purpose computers and/or computer systems, networked and/or otherwise. Where applicable, ordering of various steps described herein may be changed, combined into composite steps, and/or separated into sub-steps to provide features described herein.

In various embodiments, software for modules 112A-112N may be embedded (i.e., hard-coded) in processing component 110 or stored on memory component 120 for access and execution by processing component 110. As previously described, the code (i.e., software and/or hardware) for modules 112A-112N define, in one embodiment, processing algorithms and/or techniques for infrared images.

Embodiments described above illustrate but do not limit the disclosure. It should be understood that numerous modifications and variations are possible in accordance with the principles of the invention. Accordingly, the scope of the disclosure is defined only by the following claims.

What is claimed is:

1. A system comprising:
an infrared sensor adapted to capture infrared images;
a processing component adapted to process the captured infrared images by performing a method comprising:
extracting a first part from the captured infrared images substantially containing high spatial frequencies;
extracting a second part from the captured infrared images where mid-spatial frequencies are enhanced;
extracting a third part from the captured infrared images substantially containing low spatial frequencies;
separately scaling the first, second, and third parts; and
merging the scaled first, second, and third parts to generate one or more enhanced output images, and
wherein extracting the second part comprises locally histogram equalizing the low spatial frequencies, the locally histogram equalizing comprising:
dividing the captured infrared images into a plurality of tiles;
calculating a transfer function for each tile based on a cumulative sum of a temporally filtered histogram of each tile;
wherein an output of the transfer function for a pixel location is a weighted sum of the outputs from each transfer function associated with one or more nearest neighboring tiles; and
wherein a weight of respective transfer function outputs are inversely proportional to a distance between a pixel location being locally histogram equalized and a center of each tile; and
a display component adapted to display the enhanced output images.

2. The system of claim 1, comprising:
an image capture component having the infrared sensor adapted to capture the infrared images; and
a memory component adapted to store at least one of the captured infrared images and the enhanced output images;
wherein the separately scaling the first, second, and third parts comprises linearly rescaling each of the first, second, and third parts to a fixed dynamic range.

3. The system of claim 1, wherein the method comprises:
extracting the third part from the captured infrared images by low pass filtering the captured infrared images to obtain a low pass part;
extracting the first part from the captured infrared images by subtracting the low pass part from the captured infrared images to obtain a high pass part; and
scaling each of the first, second, and third parts by linearly rescaling each of the first, second, and third parts to a fixed dynamic range.

4. The system of claim 3, wherein the method comprises:
capturing a histogram of the low pass part of a previous frame of the captured infrared images by utilizing a delay component; and
scaling the low pass part based on a delayed histogram of the low pass part.

5. The system of claim 3, wherein the method comprises:
extracting the second part from the captured infrared images by locally histogram equalizing the low pass part to obtain an enhanced mid-spatial frequency part.

6. The system of claim 3, wherein the low pass part comprises a low frequency, high amplitude portion of the captured infrared images that is utilized by the processing component to enhance a background component of the captured infrared images, and wherein the high pass part comprises a high frequency, low amplitude portion of the captured infrared images that is utilized by the processing component to enhance a detail component of the captured infrared images.

7. The system of claim 1, wherein the temporally filtered histogram for each tile used to calculate the transfer function is a weighted sum of a previous filtered histogram and a histogram from a current frame.

8. The system of claim 1, wherein the transfer function for each tile is modified so that a slope of the transfer function does not exceed a predefined maximum value, which defines a slope limited transfer function.

9. The system of claim 8, wherein a constant slope term is added to the slope limited transfer function such that the last value of the transfer function is approximately equal to that of the last value of the transfer function prior to limiting the slope of the transfer function.

10. A method comprising:
capturing infrared images;
processing the captured infrared images to obtain a high pass portion, an enhanced mid-spatial frequency portion, and a low pass portion of the captured infrared images;
separately scaling the high pass portion, the enhanced mid-spatial frequency portion, and the low pass portion of the captured infrared images; and
merging the scaled high pass portion, the scaled mid-spatial frequency portion, and the scaled low pass portion to provide enhanced infrared images;
wherein obtaining the enhanced mid-spatial frequency portion from the captured infrared images comprises locally histogram equalizing the low pass portion to obtain the enhanced mid-spatial frequency portion, wherein the locally histogram equalizing comprises:
dividing the captured infrared images into a plurality of tiles;
calculating a transfer function for each tile based on a cumulative sum of a temporally filtered histogram of each tile;
wherein an output of the transfer function for a pixel location is a weighted sum of the outputs from each transfer function associated with one or more nearest neighboring tiles; and
wherein a weight of respective transfer function outputs are inversely proportional to a distance between a pixel location being locally histogram equalized and a center of each tile.

11. The method of claim 10, the method comprising:
displaying the enhanced infrared images; and
storing at least one of the captured infrared images and the enhanced output images;
wherein the separately scaling the high pass portion, the mid-spatial frequency portion, and the low pass portion of the captured infrared images comprises linearly rescaling each of the high pass portion, the mid-spatial frequency portion, and the low pass portion to a fixed dynamic range.

12. The method of claim 10, wherein:
obtaining the low pass portion from the captured infrared images comprises low pass filtering the captured infrared images to obtain the low pass portion;
obtaining the high pass portion from the captured infrared images comprises subtracting the low pass portion from the captured infrared images; and
separately scaling each of the portions comprises linearly rescaling each of the portions to a fixed dynamic range.

13. The method of claim 10, the method comprising:
capturing a histogram of the low pass portion of a previous frame of the captured infrared images, wherein scaling the low pass portion is based on a delayed histogram of the low pass portion.

14. The method of claim 10, wherein the temporally filtered histogram for each tile used to calculate the transfer function is a weighted sum of a previous filtered histogram and a histogram from a current frame.

15. The method of claim 10, wherein the transfer function for each tile is modified so that a slope of the transfer function does not exceed a predefined maximum value, which defines a slope limited transfer function.

16. The method of claim 15, wherein a constant slope term is added to the slope limited transfer function such that the last value of the transfer function is approximately equal to that of the last value of the transfer function prior to limiting the slope of the transfer function.

17. The method of claim 10, wherein the low pass portion comprises a low frequency, high amplitude portion of the captured infrared images that is utilized to enhance a background component of the captured infrared images, and wherein the high pass portion comprises a high frequency, low amplitude portion of the captured infrared images that is utilized to enhance a detail component of the captured infrared images.

18. A non-transitory computer-readable memory on which is stored information for performing a method, the method comprising:
capturing one or more infrared images;
processing the one or more captured infrared images to obtain a high pass portion, an enhanced mid-spatial frequency portion, and a low pass portion of the corresponding one or more captured infrared images;
separately scaling the high pass portion, the enhanced mid-spatial frequency portion, and the low pass portion of the corresponding one or more captured infrared images;
merging the scaled high pass portion, the scaled enhanced mid-spatial frequency portion, and the scaled low pass portion to provide one or more enhanced infrared images, wherein the processing the one or more captured infrared images to obtain an enhanced mid-spatial frequency portion comprises locally histogram equalizing the low pass portion and further comprises:
dividing the captured one or more infrared images into a plurality of tiles;
calculating a transfer function for each tile based on a cumulative sum of a temporally filtered histogram of each tile;
wherein an output of the transfer function for a pixel location is a weighted sum of the outputs from each transfer function associated with one or more nearest neighboring tiles; and wherein a weight of respective transfer function outputs are inversely proportional to a distance between a pixel location being locally histogram equalized and a center of each tile; and displaying the one or more enhanced infrared images.

19. The non-transitory computer-readable memory of claim 18, the method comprising:
storing the one or more captured infrared images;
storing the one or more enhanced output images; and
displaying the one or more enhanced infrared images.

20. The non-transitory computer-readable memory of claim 18, wherein:
obtaining the low pass portion from the corresponding one or more captured infrared images comprises low pass filtering the corresponding one or more captured infrared images to obtain the low pass portion;
obtaining the high pass portion from the corresponding one or more captured infrared images comprises subtracting the low pass portion from the corresponding one or more captured infrared images;
obtaining the enhanced mid-spatial frequency portion from the corresponding one or more captured infrared images comprises locally histogram equalizing the low pass portion to obtain the enhanced mid-spatial frequency portion; and
separately scaling each of the portions comprises linearly rescaling each of the portions to a fixed dynamic range.

* * * * *